(12) United States Patent
Harijan et al.

(10) Patent No.: US 12,483,864 B2
(45) Date of Patent: *Nov. 25, 2025

(54) SYSTEMS AND METHODS FOR PERSONALIZING MESSAGES BASED ON A RECIPIENT RELATIONSHIP

(71) Applicant: Adeia Guides Inc., San Jose, CA (US)

(72) Inventors: Kuppappa Dandappa Harijan, Bangalore (IN); Madhusudhan Srinivasan, Bangalore (IN)

(73) Assignee: Adeia Guides Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/680,205

(22) Filed: May 31, 2024

(65) Prior Publication Data

US 2024/0414506 A1   Dec. 12, 2024

Related U.S. Application Data

(63) Continuation of application No. 18/223,650, filed on Jul. 19, 2023, now Pat. No. 12,028,783, which is a continuation of application No. 17/833,134, filed on Jun. 6, 2022, now Pat. No. 11,758,371, which is a continuation of application No. 17/002,178, filed on Aug. 25, 2020, now Pat. No. 11,395,109, which is a (Continued)

(51) Int. Cl.
  *H04W 4/12*         (2009.01)
(52) U.S. Cl.
  CPC .................. *H04W 4/12* (2013.01)
(58) Field of Classification Search
  CPC .............. H04W 4/12; G06Q 10/107
  See application file for complete search history.

(56) References Cited

U.S. PATENT DOCUMENTS 10,791,433 B1   9/2020  Harijan et al.
11,395,109 B2   7/2022  Harijan et al.
(Continued)

FOREIGN PATENT DOCUMENTS

WO    2019027549 A1    2/2019

OTHER PUBLICATIONS

PCT International Search Report for International Application No. PCT/US2020/025460, dated Jun. 15, 2020 (14 pages), Jun. 15, 2020.

*Primary Examiner* — Diane D Mizrahi
(74) *Attorney, Agent, or Firm* — HALEY GUILIANO LLP

(57) ABSTRACT

The system receives a message from a user, along with a recipient list and generated personalized messages for recipients of the recipient list. The system determines the format of the message, and whether to, and how to, modify the message based on information about the recipient. For example, a recipient category may be used to determine how to personalize a message for each recipient. A relationship between a sender and recipient may be determined using, for example, a database of relationship information. The system modifies, for example, text, images, or video of the message to generate the personalized message. The system may access historical communications records such as a chat group record, a contacts list, a text message record, an email message record, a social media post record, or a comments record corresponding to a media content item to determine how to personalize a message.

20 Claims, 9 Drawing Sheets

Related U.S. Application Data continuation of application No. 16/370,318, filed on Mar. 29, 2019, now Pat. No. 10,791,433.

(56) References Cited

U.S. PATENT DOCUMENTS

| | | |
|---|---|---|
| 12,028,783 B2 * | 7/2024 | Harijan .................. H04W 4/12 |
| 2016/0104133 A1 | 4/2016 | Davis et al. |
| 2016/0104159 A1 | 4/2016 | Butterfield et al. |
| 2018/0375877 A1 | 12/2018 | Jakobsson et al. |
| 2020/0314604 A1 | 10/2020 | Harijan et al. |
| 2021/0029519 A1 | 1/2021 | Harijan et al. |
| 2022/0369076 A1 | 11/2022 | Harijan et al. |
| 2024/0022881 A1 | 1/2024 | Harijan et al. |

* cited by examiner

SYSTEMS AND METHODS FOR PERSONALIZING MESSAGES BASED ON A RECIPIENT RELATIONSHIP

CROSS-REFERENCE TO RELATED APPLICATIONS

This application is a continuation of U.S. patent application Ser. No. 18/223,650, filed Jul. 19, 2023, which is a continuation of U.S. patent Ser. No. 17/833,134, now U.S. Pat. No. 11,758,371, filed Jun. 6, 2022, which is a continuation of U.S. patent application Ser. No. 17/002,178, now U.S. Pat. No. 11,395,109, filed Aug. 25, 2020, which is a continuation of U.S. patent application Ser. No. 16/370,318, now U.S. Pat. No. 10,791,433, filed Mar. 29, 2019, the disclosures of each application are hereby incorporated by reference herein in their entireties.

BACKGROUND

The present disclosure relates to devices generating personalized messages, and, more particularly, devices that modify a message based on recipient.

SUMMARY

While trying to send a message to a group of entities using a typical broadcast/multicast mode, the message sent typically lacks personalization or customization. For example, a message usually takes the form of a plain text message such as "Wishing you a Merry Christmas and Happy New Year." This same message may be sent to a list of contacts or posted to social media feeds. This type of broadcast message typically lacks personalization as it is sent to multiple recipients. When sending a similar message to multiple recipients, a sender might not have the time, bandwidth, or patience to customize each message, and a universal "Happy Holidays" message may be sent to each recipient.

The present disclosure describes systems and methods for customizing messages sent to a group. For example, using the above reference to the Christmas/New Year's Eve (Xmas/NYE) wish, the system may generate personalized messages for each recipient. To illustrate, the generated messages may include "Hey Buddy, Merry Xmas and Happy New Year!", "Hello Sir, Wishing you a Merry Christmas & a Happy New year. Enjoy your New Year's party in Sydney", and "Feliz Navidad Feliz Año Nuevo" for three respective recipients. The system modifies the received message to include salutations, language, objects (e.g., images, text, video, audio), style, or any other attributes that help personalize the message for each respective recipient.

Systems are described that receive a message for broadcasting to a list of recipients, determine recipient relationships, and generate personalized messages for the recipients based on the relationships. The personalized messages may be generated, for example, by modifying the received message, applying a template, or otherwise including contextual information.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
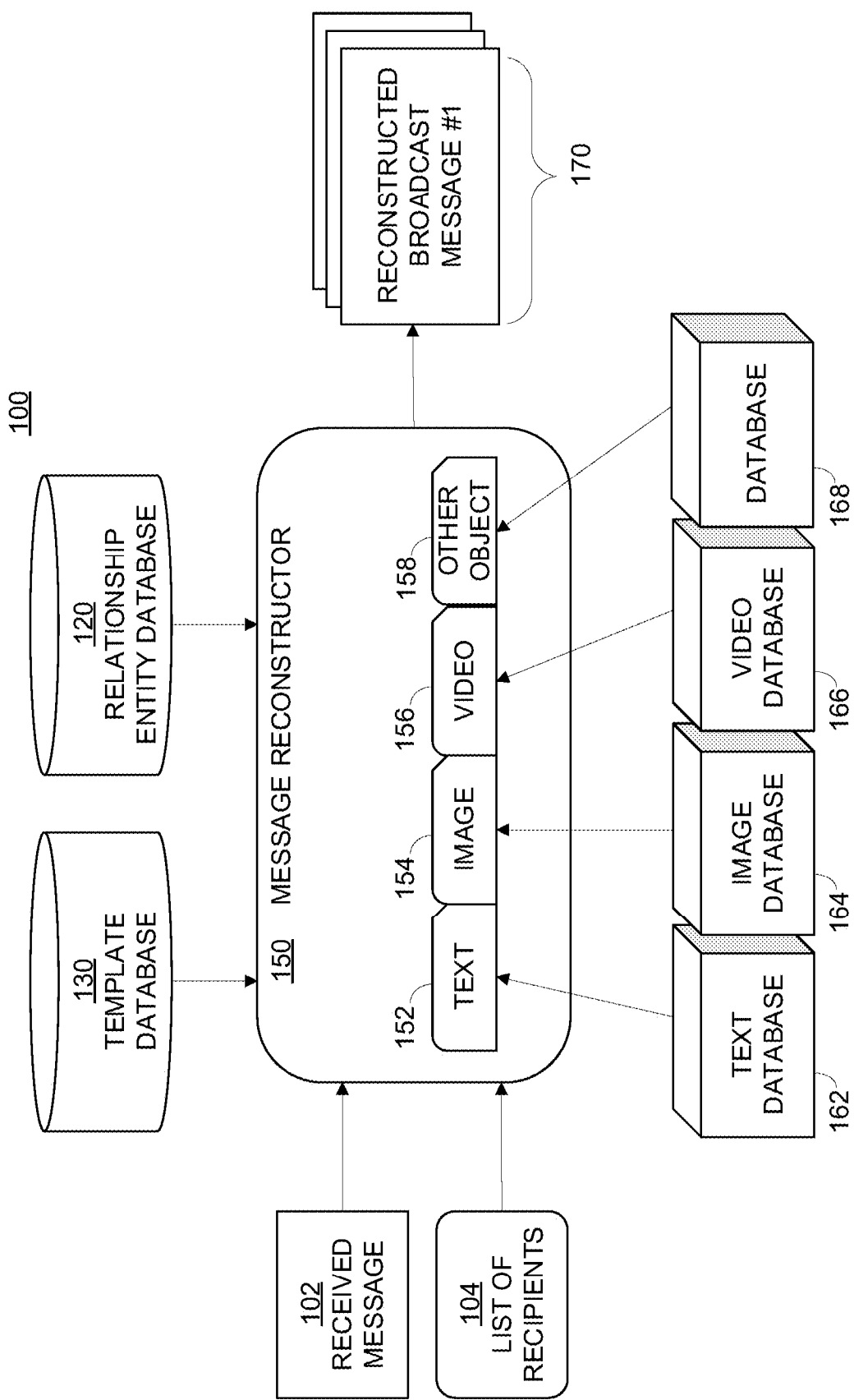
FIG. 1 is a block diagram of an illustrative system for reconstructing messages, in accordance with some embodiments of the present disclosure.

FIG. 1 is a block diagram of illustrative system 100 for reconstructing messages, in accordance with some embodiments of the present disclosure. Message reconstructor 150 receives a message (e.g., received message 102) and intended recipients (e.g., list of recipients 104), and then generates messages 170 for broadcast. Message reconstructor 150 is configured to access recipient entity database 120 to determine relationship information for each recipient of list of recipients 104. Recipients may include entities such as, for example, users, devices, accounts, instances of an application, addresses (e.g., network addresses), any other suitable entity, or any combination thereof. Message reconstructor 150 may apply one or more modifications to received message 102 to generate each of personalized messages 170. For example, message reconstructor 150 may apply text modification 152 based on text database 162. In a further example, message reconstructor 150 may apply image modification 154 based on image database 164. In a further example, message reconstructor 150 may apply video modification 156 based on video database 166. In a further example, message reconstructor 150 may apply other modification 158 based on database 168. In an illustrative example, message 102 may include a text message (e.g., entered into a smartphone), an email message (e.g., typed using a keyboard), a social media message (e.g., entered using an application on a smartphone), any other suitable message type, or any combination thereof.

Message reconstructor 150 may be used when a user wants to transmit a message to a group of people. Message reconstructor 150 includes databases that include different message formats, templates, objects, or a combination thereof. Based on the message itself, as well as the relationship between the user and each recipient, message reconstructor 150 may access the appropriate database for modifying the message. For example, message reconstructor 150 may include message reconstructing plug-ins (e.g., software modules) that are assigned a recipient name, sender name and the message to be sent. The plug-in may access the relationship entity database (e.g., managed by a relationship analyzer) to find relationship information such as broad grouping, narrow grouping, common phrases, or any other suitable information. The plug-in may then reconstruct the message by adding salutations, emojis, or other suitable modifications that result in a personalized message.

In an illustrative example, message reconstructor 150 identifies a type for each message of messages 170 to be sent and invokes an appropriate plug-in, application, module, or combination thereof. For each recipient, the plug-in identifies aspects of the messages that can be personalized. For example, the plug-in may access a predetermined plug-in dictionary for this purpose. The plug-in accesses the relationship entity database to determine personalization options for the recipient. The plug-in then generates the personalized message for transmittal. In some embodiments, message reconstructor 150 may generate each personalized message in parallel, in series, or a combination thereof. For example, an instance of the plug-in may repeat operations to generate each personalized message sequentially (e.g., in series). In a further example, multiple instances of the plug-in may operate in parallel to generate personalized messages in parallel. Referencing FIG. 1, text modification 152 may include a text plug-in configured to access database 162, image modification 154 may include an image plug-in configured to access database 164, video modification 156 may include a video plug-in configured to access database 166, and other modification 158 may include a plug-in configured to access database 168. For example, each plug-in may access a respective database, or the same database, using search keys.

In a further example, a text plug-in may be configured to categorize messages as related to well-wishes, greetings, events (e.g., festivals, holidays). In some embodiments, the text plug-in is configured to extract context using keywords (e.g., "Christmas," "Diwali," "Birthday" or any other suitable keyword). In a further example, an image plug-in may be configured to determine background and object identifiers along with text scrapers to identify a greeting type. The video plug-in may be configured to extend the image plug-in by repeating across frames of images. Once constructs of the message have been determined, the plug-in then would begin personalization by accessing the relationship entity database to determine a relationship (e.g., although this may occur in any suitable order). For example, a text plug-in may be configured to insert salutations, insert emojis, change fonts, change language, change wording, or a combination thereof. In a further example, an image plug-in may be configured to change texts in images, change background colors, change attached images, or a combination thereof. In a further example, a video plug-in may be configured to insert customized texts (e.g., an overlay) to a video message, insert a video clip in a text message, or a combination thereof.

Relationship entity database 120 includes a structured collection of information corresponding to relationships among entities. In some embodiments, relationship entity database 120 includes relationship identifiers among entities. For example, relationship identifiers may identify to which recipient category a recipient belongs relative to the sender. Entities may include, for example, users, persons, devices (e.g., user devices, network devices), locations corresponding to users, locations corresponding to devices, network entities, addresses (e.g., location-based or network-based), accounts (e.g., social media accounts, messaging services accounts), any other suitable entity that corresponds to a message sender or receiver, or any combination thereof. Relationships may include, for example, a context of interaction between entities (e.g., person to person), a category associated with a contact in a contact list, communication relationship (e.g., devices on a particular network, devices hosting a particular application), a linkage in an application (e.g., entities linked in a social network or messaging application), any other suitable relationship type, or any combination thereof. For example, a relationship identifier may include a relationship between two devices (e.g., identified by a hardware address, an IP address, device name, or other suitable identifier) that may correspond to senders and receivers of messages. For example, a device may be configured to generate messages to broadcast to recipients, without input of a message from a user. In some embodiments, message reconstructor 150 accesses relationship entity database 120, transmits entity identifiers (e.g., of a sender and recipients) to relationship entity database 120 (e.g., using a query), and retrieves a relationship identifier (e.g., identifying a recipient category such as "friend" or "coworker").

In some embodiments, message reconstructor 150 retrieves template information from template database 130. Template database 130 may include one or more templates for parsing a message into sections. For example, a template may be configured to identify a salutation, a name, a message body, a sentence, a phrase, a send-off, an attachment, metadata associated with the message, a format of the message, any other attribute of the message, or any combination thereof. In some embodiments, the message reconstructor applies a plurality of templates to determine which most closely matches the message's format. In some embodiments, message reconstructor 150 transmits the message and corresponding metadata to template database 130. In some embodiments, message reconstructor 150 retrieves a plurality of templates from template database 130 and then applies the templates to the message to determine which template applies. In some embodiments, message reconstructor 150 may determine the message format based on which template fits a matching criterion of the parts of the message. For example, a received message having a salutation, a message body, a send-off, and a signature may best match, based on the system parsing the message, an email message template having those components.

In some embodiments, template database 130 includes templates for formatting a reconstructed message. In some embodiments, a template includes instructions, criteria, or other features by which the system may determine how to format a message, determine a format of a message, or both. For example, message reconstructor 150 may receive a message and a list of recipients, each having a corresponding recipient category. For example, a recipient category "coworker" may have an associated template that includes more formal salutations, message structure, and send-off. In a further example, the template for recipient category "coworker" may apply a spelling check, a grammar check, replacement of abbreviations, replacement of phrases or words (e.g., to remove profanity, slang, or informal text), removal of images or video, any other suitable formatting appropriate for the recipient category, or any combination thereof. In a further example, the template for recipient category "friend" need not apply a spelling check or a grammar check, and may replace longhand words or phrases with abbreviations or other shorthand (e.g., determined from communications records), any other suitable formatting appropriate for the recipient category, or any combination thereof. In a further example, a template may be selected based on the message format to guide the structure of the reconstructed message.

In some embodiments, message reconstructor 150 may determine a message based on contextual information of the message. For example, message reconstructor 150 may determine a context of a received message, and then select a template that corresponds to the context. In an illustrative example, message reconstructor 150 may determine that a received message includes a dinner invitation to a plurality of guests. Message reconstructor 150 may retrieve from template database 130 a template corresponding to an event invitation, which may include text relevant to an invitation (e.g., "you are invited to:", a date, a time, a theme). In a further example, message reconstructor 150 may determine a context of a message to be holiday-related and may accordingly select a template that includes holiday-themed images or video to be included in the message. Message reconstructor 150 may use any suitable criterion to select a template from template database 130.

Figure 2:
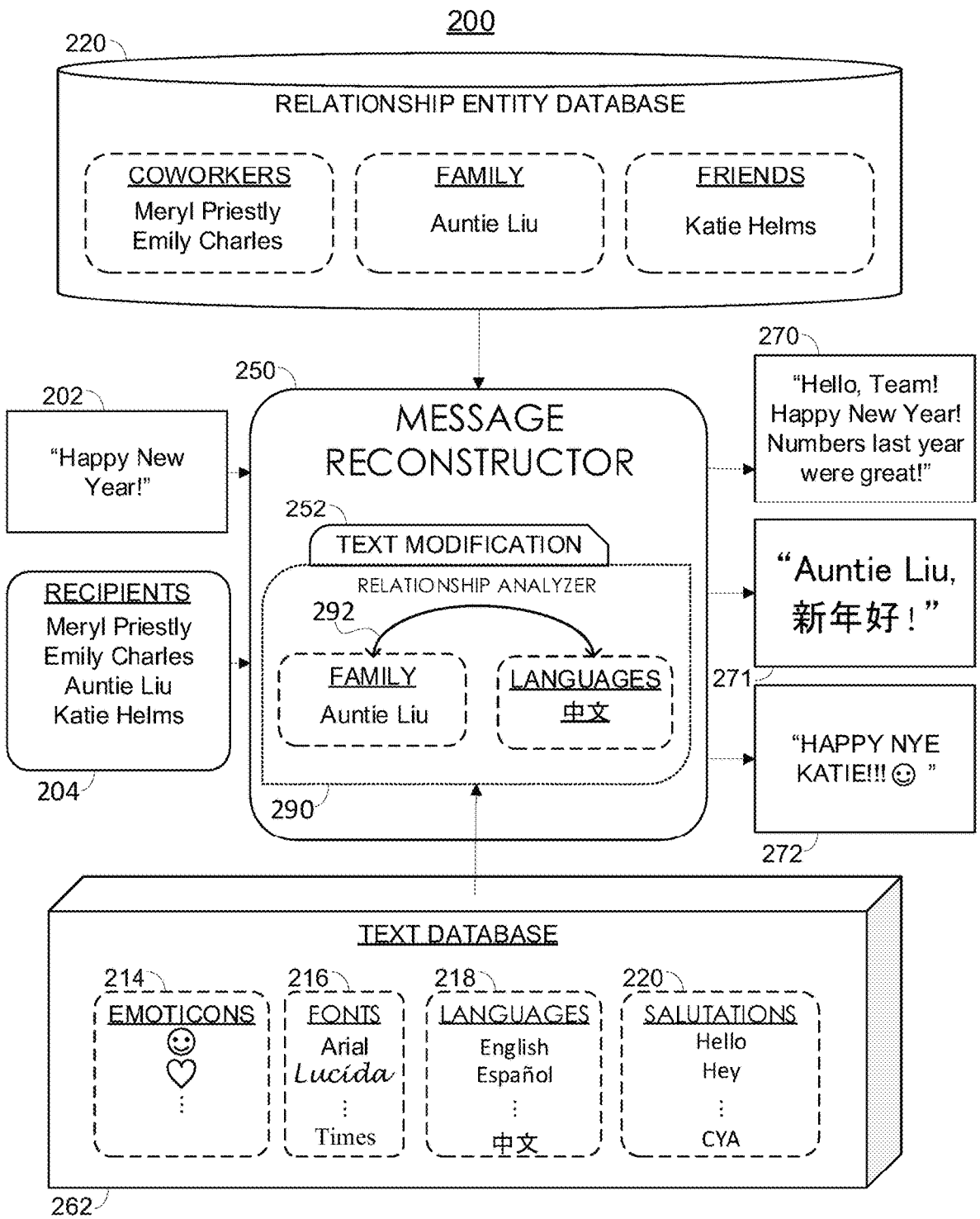
FIG. 2 is a block diagram of an illustrative system for reconstructing messages, having a particular received message, in accordance with some embodiments of the present disclosure.

FIG. 2 is a block diagram of illustrative system 200 having a received message 202, in accordance with some embodiments of the present disclosure. System 200 is similar to system 100 of FIG. 1, with only text modification 252 included for purposes of discussion. As illustrated, message reconstructor 250 receives message 202, which includes the text "Happy New Year!" For example, a user may enter "Happy New Year!" to a displayed keyboard on a touchscreen of a user device. The user also indicates the user device recipients 204, which includes four people, as illustrated. For each recipient of recipients 204, message reconstructor 250 may access relationship entity database 220 to determine relationship information. To illustrate, relationship analyzer 290 may identify each recipient and determine a relationship of the recipient. Text database 262 includes information for modifying message 202 such as, for example, emoticons 214, fonts 216, languages 218, salutations 220, or any other suitable information that may be used to modify message 202.

For recipient "Auntie Liu," relationship analyzer 290 may query relationship entity database 220 to determine a relationship of "family." Based on user preferences, relationship analyzer 290 may determine that text of received message 202 should be converted to Chinese characters for recipients that are "family." Accordingly, personalized message 271 to recipient Auntie Liu includes the original message (e.g., received message 202), but with text modification 252 including replacement of the text with Chinese characters and the salutation "Auntie Liu" inserted.

For recipient "Katie Helms," relationship analyzer 290 may query relationship entity database 220 to determine a relationship of "friend." Based on user preferences, relationship analyzer 290 may determine that text of received message 202 should be converted to informal (e.g., using an acronym or other shorthand) for recipients that are "friends." Accordingly, personalized message 272 to recipient Katie Helms includes a modification of the original message (e.g., received message 202). Text modification 252 includes replacement of the text of message 202 with "Happy NYE," the recipient first name "Katie" inserted after the text, extra exclamation points inserted, and a smiling face emoticon inserted at the end.

For recipients "Meryl Priestly" and "Emily Charles," relationship analyzer 290 may query relationship entity database 220 to determine a relationship of "coworkers." Based on user preferences, relationship analyzer 290 may determine that text of received message 202 should be appended with further text for recipients that are "coworkers." Accordingly, personalized message 270 for each of recipients Meryl Priestly and Emily Charles includes the original message (e.g., received message 202), but with text modification 252 including a salutation of "Hello, Team!" inserted at the beginning, the original message, and insertion of text "Numbers last year were great!" after the original message.

As illustrated in FIG. 2, system 200 may modify a single message of "Happy New Year!" for transmittal to different recipients having differing relationships with the sending user. In some embodiments, system 200 may include other databases for modifying a message instead of, or in addition to, text database 262. For example, system 200 may include a video database, an audio database, an image database, any other suitable database, or any combination thereof. Accordingly, a personalized message may include a video, an audio clip, an image, a link (e.g., a hyperlink), any other suitable object, or any combination thereof.

In some embodiments, relationship analyzer 290 is configured to determine the relationships among persons based on stored relationship identifiers. In some embodiments, relationship analyzer 290 is configured to classify the relationships among persons based on styles used by the individuals during their conversations.

Figure 3:
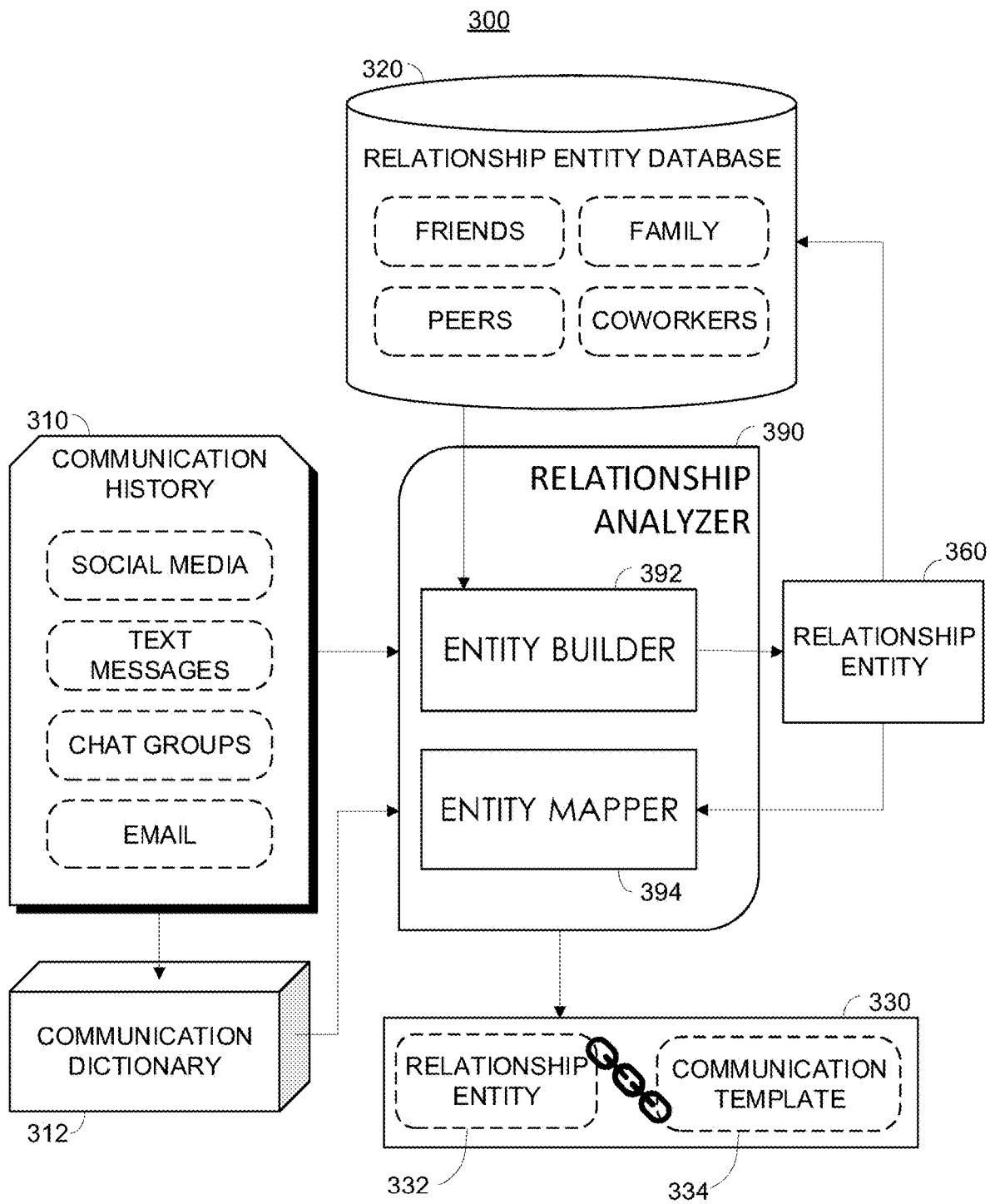
FIG. 3 is a block diagram of an illustrative system for determining recipient relationship information, in accordance with some embodiments of the present disclosure.

FIG. 3 is a block diagram of illustrative system 300 for determining recipient relationship information, in accordance with some embodiments of the present disclosure. Relationship analyzer 390 includes entity builder 392 configured to determine or confirm a recipient relationship, and entity mapper 394 configured to determine which relationship the recipient is associated with. In some embodiments, relationship analyzer 390 is included in a user's device and is configured to determine relationship information relative to that user. In some embodiments, relationship analyzer 390 is included in a network device (e.g., a server coupled to a communications network) and is configured to determine relationship information among many users based on their interactions. Relationship analyzer 390 may retrieve information from communication history 310, which contains historical communications records such as social media communications, text messages (e.g., SMS messages), chat group records, email records, any other suitable communications records, or any combination thereof. In some embodiments, communication history 310 is stored in memory of a network entity (e.g., a remote server), a cloud-based server, a central processing device, the user device, or a combination thereof. In some embodiments, communication dictionary 312 is configured to extract keywords, identify keywords, parse communications, or otherwise analyze historical communications records of communication history 310. In some embodiments, relationship analyzer 390 is configured to communicate with relationship entity database 320. In some embodiments, relationship analyzer 390 is configured to communicate with database 330 to determine one or more communication templates 334 based on a determined relationship entity 332. In some embodiments, database 330 is configured to store a plurality of communication templates 334 (e.g., message templates for formatting messages) that correspond to relationship entities 332. For example, for relationship entity "friend," database 330 may store linked communication template 334 that includes less formal salutations, emojis, abbreviations, any other message style attributes that may be inputted or extracted from historical communications records, or any combination thereof. In a further example, for relationship entity "coworker," database 330 may store linked communication template 334 that includes more formal salutations, send-offs, full names and titles, teamwork-oriented phrases, any other message style attributes that may be inputted or extracted from historical communications records, or any combination thereof. In a further example, for relationship entity "Family," database 330 may store linked communication template 334 that includes a nickname, emojis, abbreviations, text in a different language, any other message style attributes that may be inputted or extracted from historical communications records, or any combination thereof.

To illustrate, relationship analyzer 390 may be configured to curate relationships into broad and narrow groups that are used to generate messages to be sent in a broadcast/multicast scenario. For example, relationship analyzer 390 may be configured to store key phrases used in chats between individuals (e.g., "Buddy," "Howdy," or a salutation). In a further example, relationship analyzer 390 may be configured to determine Broad (Narrow) groups such as Work (colleagues, superiors, junior personnel), Friends (school, college, neighborhood, social), Relation (blood, family, romantic), Social (e.g., Facebook, WhatsApp, Snapchat, Twitter), any other suitable Broad (Narrow) grouping, or any combination thereof. In some embodiments, relationship analyzer 390 analyzes one or more interactions between individuals and may parse the interactions into units that can be analyzed (e.g., at appropriate punctuation marks, emojis, keywords, or other breakpoints). In some embodiments, relationship analyzer 390 searches for known patterns in its dictionary and builds a relationship. For example, if a profile has already been built for an interaction, relationship analyzer 390 may validate the relationship based on the information in its database.

In an illustrative example, relationship analyzer 390 may determine that user A and user B may be friends as well as colleagues based on their conversation styles. In some embodiments, both relationship entities are stored for the A-B pair in relationship entity database 320 for message reconstruction (e.g., using the appropriate relationship to build a personalized message). In some embodiments, relationship analyzer 390 identifies the presence of one or more individuals in a social group. For example, if employees of an organization are a part of a WhatsApp group, relationship analyzer 390 may associate the broad group as "Work." Further, relationship analyzer 390 may determine a narrower categorization ("Peer," "Superior, "Team member") based on a conversation style (e.g., including "Sir," "Buddy," or "Colleague") of historical conversations. Accordingly, relationship analyzer 350 stores relationship information in relationship entity database 320. For example, relationship analyzer 390 may store information such as user name, broad group identifier, narrow group identifier, commonly used objects (e.g., terms, salutations, emojis, language, wallpapers), user preferences (e.g., how to format messages to recipients of different relationship entity), any other suitable information, or any combination thereof.

In an illustrative example, Table 1 shows a record of relationship entity database 320.

TABLE 1

Illustrative record of relationship entity database.

| | |
|---|---|
| Names: | "Ram" and "Shvam" |
| Broad grouping: | "Work" |
| Narrow grouping: | "Peers" |
| Keywords: | {"Buddy"; "Bye"; "GN"; "Howdy"; ":)"} |

As illustrated in Table 1, the record includes Names (e.g., Ram and Shvam in this example), a broad grouping (e.g., Ram and Shvam are coworkers), a narrow grouping (e.g., Ram and Shvam are peers at work), and several keywords (e.g., "Buddy" as a nickname, "Bye" as a send-off, "GN" as a send-off, "Howdy" as a salutation, and an emoticon for inclusion in messages).

Figure 4:
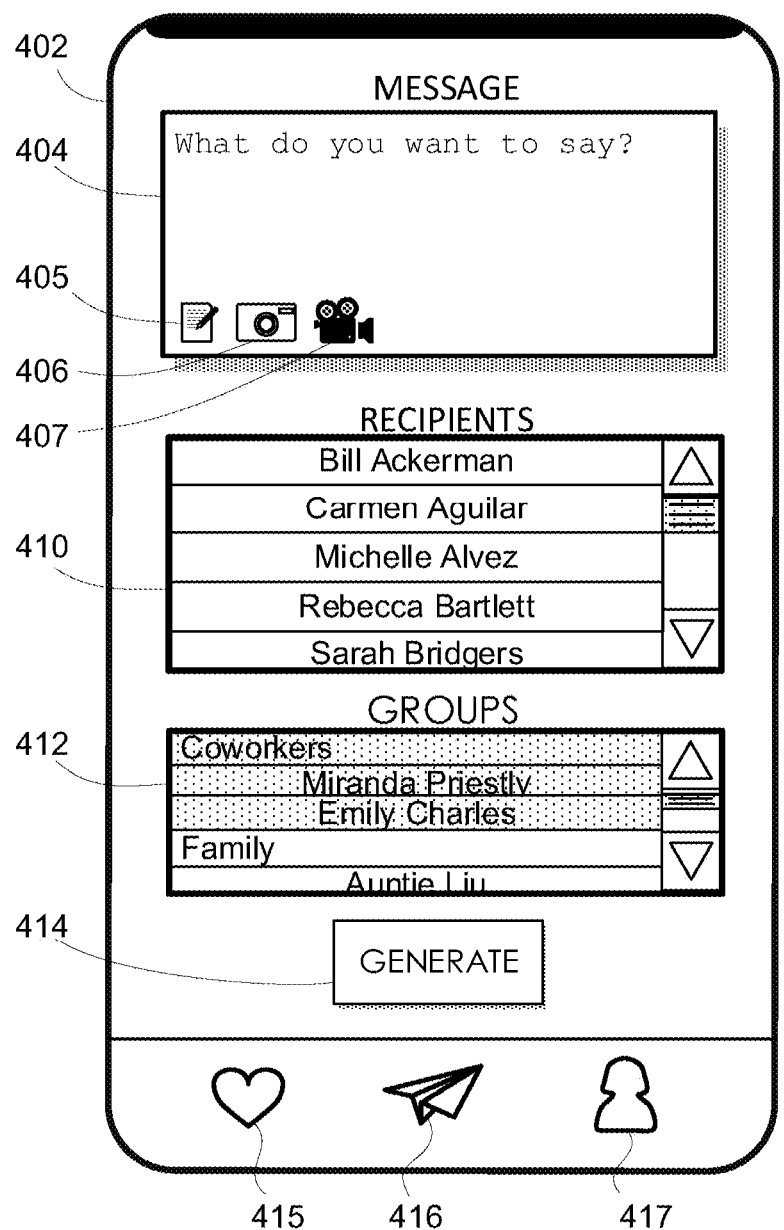
FIG. 4 shows a face view of an illustrative device display for inputting a desired message to be sent, in accordance with some embodiments of the present disclosure.

FIG. 4 shows a face view of illustrative device display 402 for inputting a desired message to be sent, in accordance with some embodiments of the present disclosure. Device 400 may include a smartphone or other suitable user device configured to receive a message inputted by a user. As illustrated, device display 402 shows a text entry region 404 with icons 405-407, list of potential recipients 410, list of broad groupings 412, soft button 414 configured to receive a user indication to generate personalized messages, and icons 415-417 for indicating user instructions in navigating the displayed software application.

Text entry region 404 may include a displayed cursor and may display text inputted by a user. For example, the user may provide haptic interaction to the screen of device 400 by touching displayed keys of a displayed keyboard. In a further example, a user may enter a message to text entry region 404. Icon 405 corresponds to inserting text into text entry region 404. For example, when a user selects icon 405 (e.g., pressing the region of the screen corresponding to icon 405), a touchscreen keyboard may be displayed. Icon 406 corresponds to inserting an image into text entry region 404. For example, when a user selects icon 406 (e.g., pressing the region of the screen corresponding to icon 406), a file folder, directory, camera application, or thumbnail gallery of stored images may be displayed. Icon 407 corresponds to inserting video into text entry region 404. For example, when a user selects icon 407 (e.g., pressing the region of the screen corresponding to icon 407), a file folder, directory, a camera application, or thumbnail gallery of stored videos may be displayed.

List of potential recipients 410, as illustrated, includes a list of recipients to whom messages may be sent. For example, list of potential recipients 410 may include a contacts list stored in memory of device 400. In a further example, list of potential recipients 410 may include recipients with whom the user has communicated using device 400, an application of device 400, a list of social media network entities connected to the user, or any combination thereof. List of potential recipients 410, as illustrated, includes a vertical list with a scroll bar for navigating the list.

List of broad groupings 412 includes a list of broad group identifiers such as "Coworkers" and "Family" as illustrated. In some embodiments, recipients of list of potential recipients 410 may be grouped into broad groupings in list of broad groupings 412. List of broad groupings 412, as illustrated, includes a vertical list with a scroll bar for navigating the list, with a listing of corresponding recipients provided for each broad grouping.

Soft button 414 may be selected by a user (e.g., by pressing the region of the screen corresponding to soft button 414) to generate a plurality of personalized messages. Icons 415, 416, and 417 may be used to navigate the software messaging application displayed. For example, as illustrated, icon 416 indicates a "send message" screen (e.g., currently displayed), on which the user may compose a message, select recipients, and send personalized messages.

In an illustrative example, a user may input a message to text entry region 404, select a plurality of recipients from either list of potential recipients 410 or list of broad groupings 412, and generate a plurality of messages by selecting soft button 414.

Figure 5:
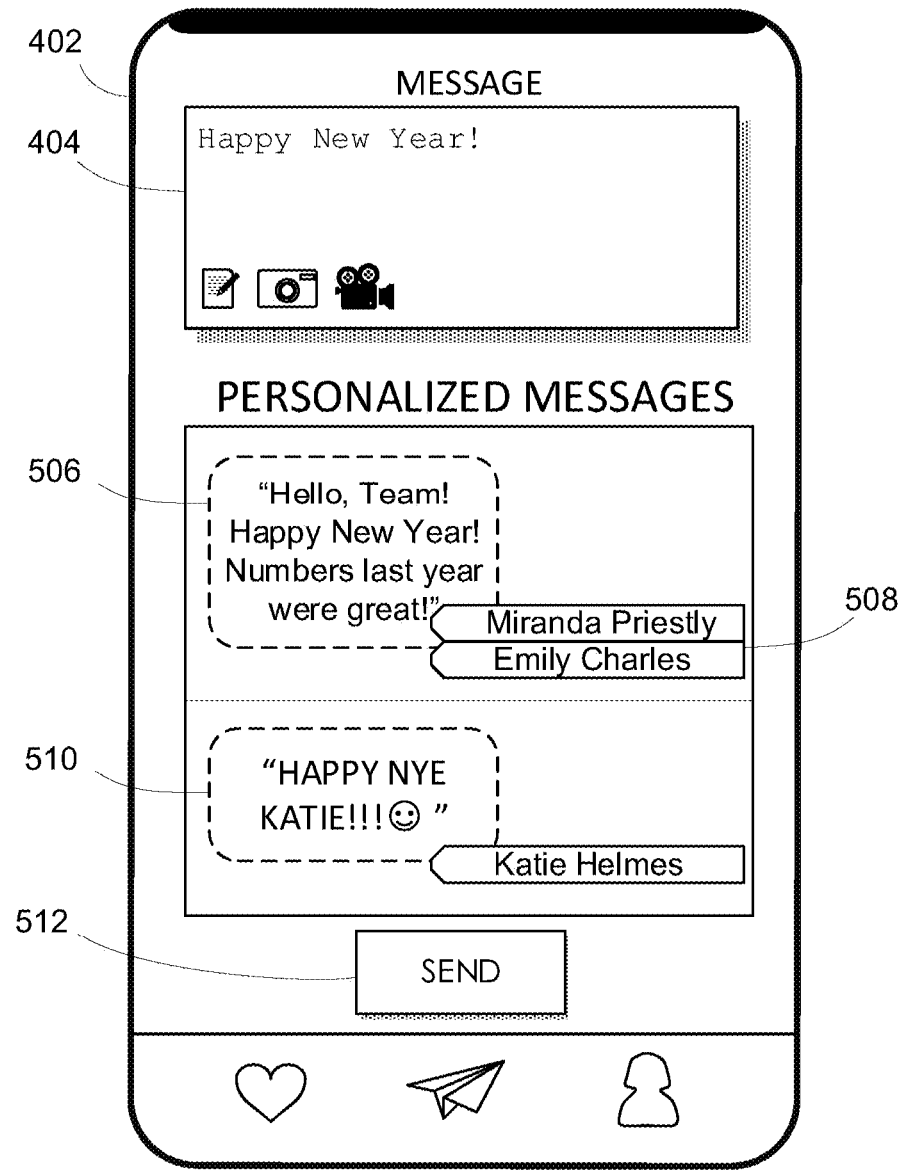
FIG. 5 shows a face view of the illustrative device display of FIG. 4, with a received message and personalized messages, in accordance with some embodiments of the present disclosure.

FIG. 5 shows a face view of illustrative device display 402 of FIG. 4, with a received message and personalized messages, in accordance with some embodiments of the present disclosure. The user has entered the message "Happy New Year!" into text entry region 404 and generated personalized messages 506 and 510. As illustrated, the user has selected three recipients, two of whom are "Coworkers" (e.g., see list of broad groupings 412 of FIG. 4), and one of whom is a "Friend" (e.g., Katie Helms). Personalized message 506 for the coworkers is tailored for work, including text that has relevance for the workplace, and a format that is mostly formal. Personalized message 510 for the friend is less formal than personalized message 506, including a recipient name, an abbreviation, an emoticon, and several exclamation points to indicate excitement. Accordingly, the original message "Happy New Year!" is used to generate personalized messages 506 and 510 having differing formats, language, and tones.

Figure 6:
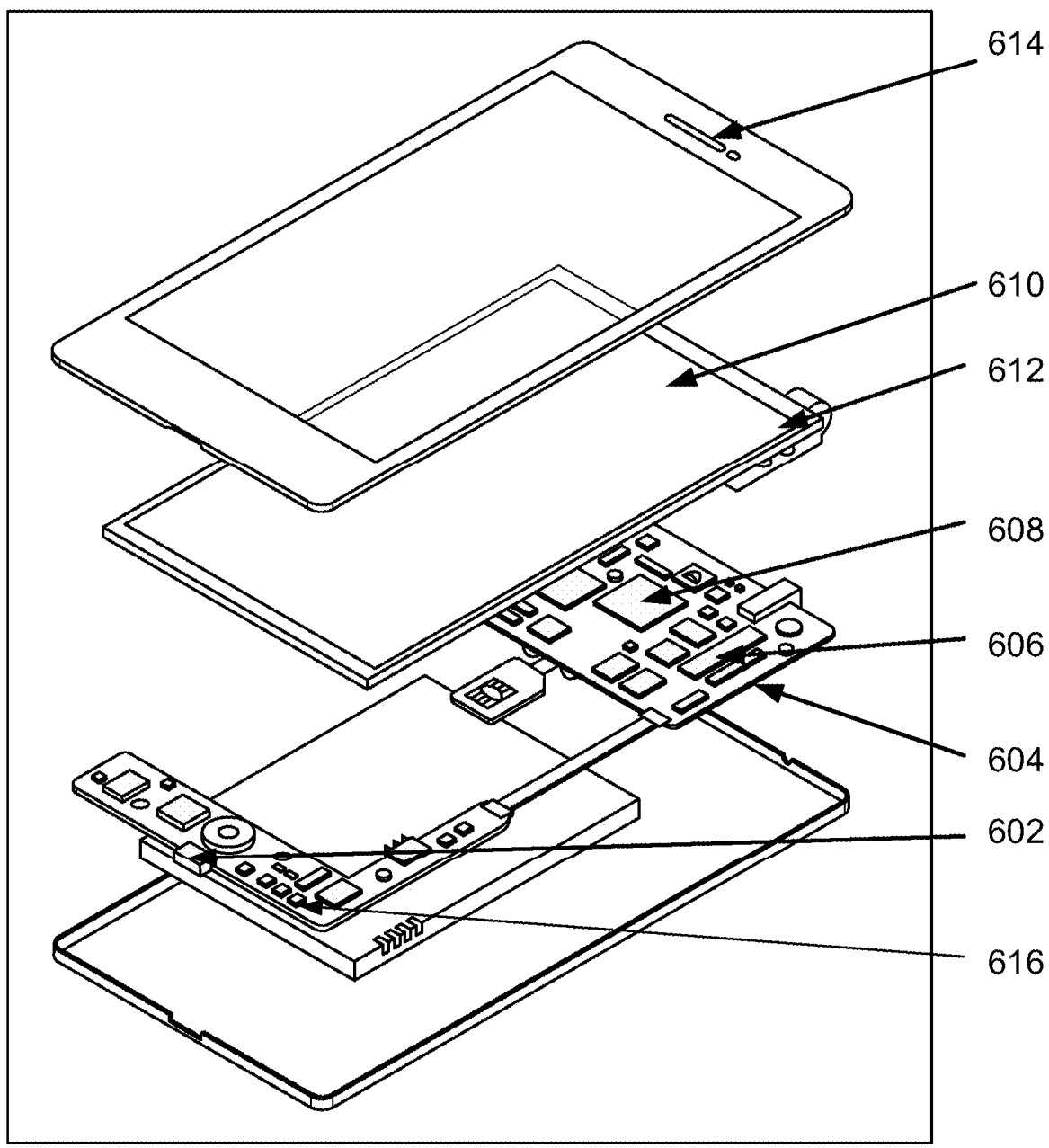
FIG. 6 is a block diagram of an illustrative user device, in accordance with some embodiments of the present disclosure.

A user may access content, an application, and other features from one or more of their devices (i.e., user equipment). FIG. 6 shows generalized embodiments of an illustrative user device. Although illustrated as a mobile user device (e.g., a smartphone), user device 600 may include any user electronic device with which a user may send and receive messages with other users. For example, user device 600 may include a desktop computer, a tablet, a laptop, a remote server, any other suitable device, or any combination thereof. In some embodiments, display 612 may include a touchscreen, a television display or a computer display. In some embodiments, the one or more circuit boards illustrated include processing circuitry, control circuitry, and storage (e.g., RAM, ROM, Hard Disk, Removable Disk, etc.). In some embodiments, circuit boards include an input/output path. User device 600 may receive content and data via input/output (hereinafter "I/O") path 602. I/O path 602 may provide content and data to control circuitry 604, which includes processing circuitry 606 and storage 608. Control circuitry 604 may be used to send and receive commands, requests, and other suitable data using I/O path 602. I/O path 602 may connect control circuitry 604 (and specifically processing circuitry 606) to one or more communications paths (described below). I/O functions may be provided by one or more of these communications paths but are shown as a single path in FIG. 6 to avoid overcomplicating the drawing.

Control circuitry 604 may be based on any suitable processing circuitry such as processing circuitry 606. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry is distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 604 executes instructions for an application stored in memory (e.g., storage 608). Specifically, control circuitry 604 may be instructed by the application to perform the functions discussed above and below. For example, the application may provide instructions to control circuitry 604 to generate media guidance displays. In some implementations, any action performed by control circuitry 604 may be based on instructions received from the application.

In some client-server-based embodiments, control circuitry 604 includes communications circuitry suitable for communicating with an application server or other networks or servers. The instructions for carrying out the above-mentioned functionality may be stored on the application server. Communications circuitry may include a cable modem, an integrated-services digital network (ISDN) modem, a digital subscriber line (DSL) modem, a telephone modem, an ethernet card, or a wireless modem for communications with other equipment, or any other suitable communications circuitry. Such communications may involve the Internet or any other suitable communications networks or paths. In addition, communications circuitry may include circuitry that enables peer-to-peer communication of user equipment devices, or communication of user equipment devices in locations remote from each other (described in more detail below).

Memory may be an electronic storage device provided as storage 608 that is part of control circuitry 604. As referred to herein, the phrase "electronic storage device" or "storage device" should be understood to mean any device for storing electronic data, computer software, or firmware, such as random-access memory, read-only memory, hard drives, optical drives, solid state devices, quantum storage devices, gaming consoles, gaming media, or any other suitable fixed or removable storage devices, and/or any combination of the same. Storage 608 may be used to store various types of content described herein as well as media guidance data described above. Nonvolatile memory may also be used (e.g., to launch a boot-up routine and other instructions). Cloud-based storage, for example, may be used to supplement storage 608 or instead of storage 608.

A user may send instructions to control circuitry 604 using user input interface 610. User input interface 610, display 612, or both, may include a touchscreen configured to provide a display and receive haptic input. For example, the touchscreen may be configured to receive haptic input from a finger, a stylus, or both. In some embodiments, equipment device 600 may include a front-facing screen and a rear-facing screen, multiple front screens, or multiple angled screens. In some embodiments, user input interface 610 includes a remote-control device having one or more microphones, buttons, keypads, any other components configured to receive user input or combinations thereof. For example, user input interface 610 may include a handheld remote-control device having an alphanumeric keypad and option buttons.

Audio equipment 614 may be provided as integrated with other elements of user device 600 or may be stand-alone units. The audio component of videos and other content displayed on display 612 may be played through speakers of audio equipment 614. In some embodiments, the audio may be distributed to a receiver (not shown), which processes and outputs the audio via speakers of audio equipment 614. In some embodiments, for example, control circuitry 604 is configured to provide audio cues to a user, or other audio feedback to a user, using speakers of audio equipment 614. Audio equipment 614 may include a microphone configured to receive audio input such as voice commands or speech. For example, a user may speak letters or words that are received by the microphone and converted to text by control circuitry 604. In a further example, a user may voice commands that are received by the microphone and recognized by control circuitry 604.

An application (e.g., for generating a display) may be implemented using any suitable architecture. For example, a stand-alone application may be wholly implemented on user device 600. In some such embodiments, instructions for the application are stored locally (e.g., in storage 608), and data for use by the application is downloaded on a periodic basis (e.g., from an out-of-band feed, from an Internet resource, or using another suitable approach). Control circuitry 604 may retrieve instructions of the application from storage 608 and process the instructions to generate any of the displays discussed herein. Based on the processed instructions, control circuitry 604 may determine what action to perform when input is received from input interface 610. For example, movement of a cursor on a display up/down may be indicated by the processed instructions when input interface 610 indicates that an up/down button was selected. An application and/or any instructions for performing any of the embodiments discussed herein may be encoded on computer readable media. Computer-readable media includes any media capable of storing data. The computer-readable media may be transitory, including, but not limited to, propagating electrical or electromagnetic signals, or it may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

In some embodiments, the application is a client-server-based application. Data for use by a thick or thin client implemented on user device 600 is retrieved on demand by issuing requests to a server remote from user device 600. For example, the remote server may store the instructions for the application in a storage device. The remote server may process the stored instructions using circuitry (e.g., control circuitry 604) and generate the displays discussed above and below. The client device may receive the displays generated by the remote server and may display the content of the displays locally on user device 600. This way, the processing of the instructions is performed remotely by the server while the resulting displays (e.g., that may include text, a keyboard, or other visuals) are provided locally on user device 600. User device 600 may receive inputs from the user via input interface 610 and transmit those inputs to the remote server for processing and generating the corresponding displays. For example, user device 600 may transmit a communication to the remote server indicating that an up/down button was selected via input interface 610. The remote server may process instructions in accordance with that input and generate a display of the application corresponding to the input (e.g., a display that moves a cursor up/down). The generated display is then transmitted to user device 600 for presentation to the user.

In some embodiments, the application is downloaded and interpreted or otherwise run by an interpreter or virtual machine (e.g., run by control circuitry 604). In some embodiments, the application may be encoded in the ETV Binary Interchange Format (EBIF), received by control circuitry 604 as part of a suitable feed, and interpreted by a user agent running on control circuitry 604. For example, the application may be an EBIF application. In some embodiments, the application may be defined by a series of JAVA-based files that are received and run by a local virtual machine or other suitable middleware executed by control circuitry 604.

Figure 7:
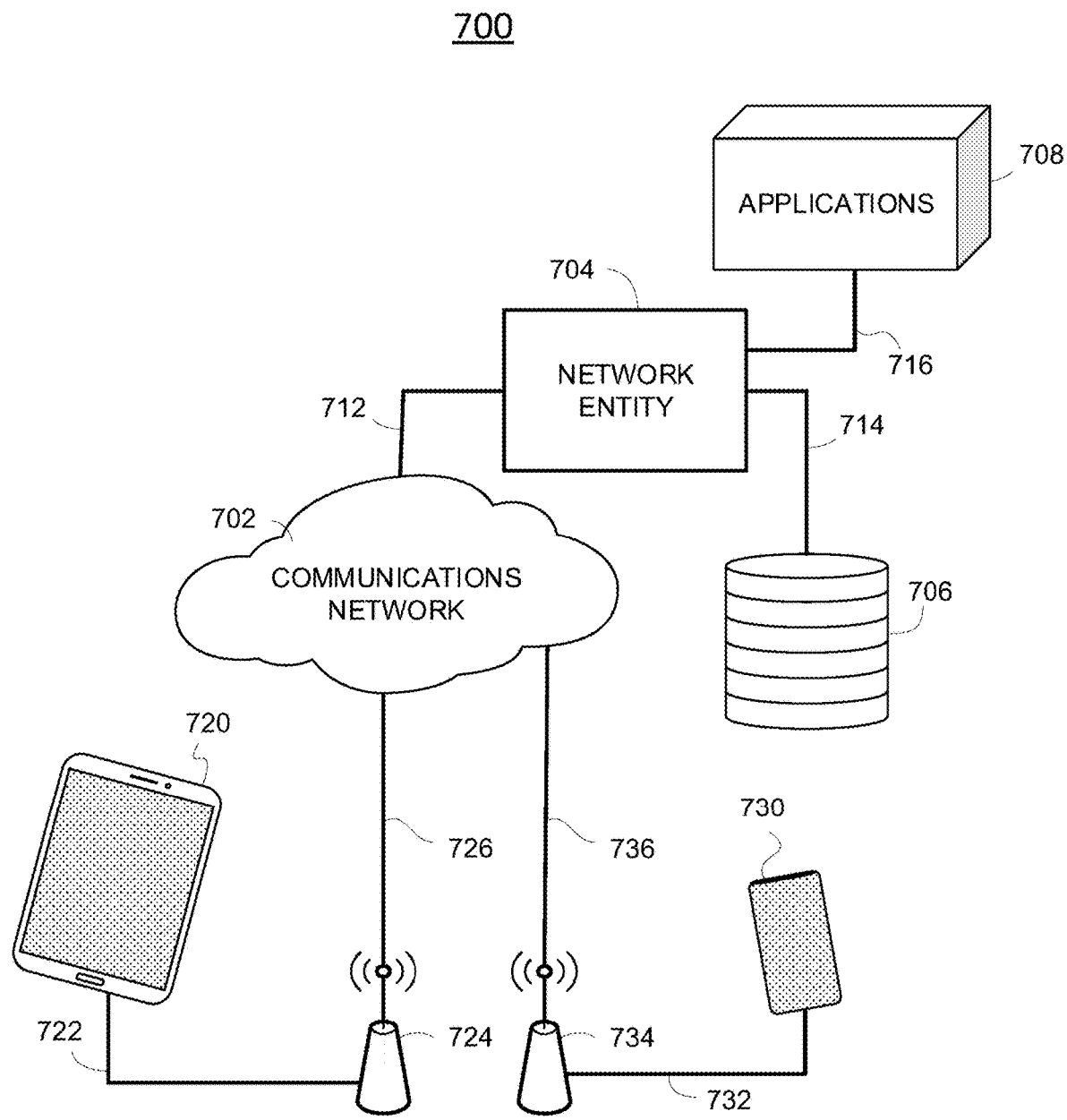
FIG. 7 is a block diagram of an illustrative system for transmitting messages, in accordance with some embodiments of the present disclosure.

FIG. 7 is a block diagram of illustrative system 700 for transmitting messages, in accordance with some embodiments of the present disclosure. In system 700, there may be more than one of each type of user device, but only one of each is shown in FIG. 7 to avoid overcomplicating the drawing. In addition, each user may utilize more than one type of user device and also more than one of each type of user device. In some embodiments, a user device (e.g., user device 730, user computer equipment 720) may be referred to as a "second screen device." For example, a second screen device may supplement content, software applications, or other functionality presented on a first user device. As illustrated, a first user may use user device 720 and a second user may use user device 730 (e.g., a sender and a recipient of a message).

User devices 720 and 730, illustrated as wireless-enabled devices, may be coupled to communications network 702 (e.g., the Internet). For example, user device 720 is coupled to communications network 702 via communications path 722 to access point 724 and wired connection 726, and user device 730 is coupled to communications network 702 via communications path 732 to access point 734 and wired connection 736. User devices 720 and 730 may also include wired connections to a LAN, or any other suitable communications link to network 702. Communications network 702 may be one or more networks including the Internet, a mobile phone network, mobile voice or data network (e.g., a 4G or LTE network), cable network, public switched telephone network, or other types of communications network or combinations of communications networks. Paths 712, 726, and 736 may separately or together include one or more communications paths, such as a satellite path, a fiber-optic path, a cable path, a path that supports Internet communications, free-space connections (e.g., for broadcast or other wireless signals), or any other suitable wired or wireless communications path or combination of such paths. Although communications paths are not drawn between user devices 720 and 730, these devices may communicate directly with each other via communications paths, such as those described above in connection with paths 726 and 736, as well as other short-range point-to-point communications paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 702.

System 700 includes network entity 704 (e.g., a server or other suitable computing device) coupled to communications network 702 via communications path 712. Path 712 may include any communications path described above in connection with paths 726 and 736. Communications with network entity 704 may be exchanged over one or more communications paths but are shown as a single path in FIG. 7 to avoid overcomplicating the drawing. Network entity is configured to access database 706 or applications 708 (e.g., an applications database or host server) via communications links 714 and 716, respectively. Although shown as separate device, network entity 704 may include database 706 and applications 708 (e.g., stored in memory). In addition, there may be more than one of each of database 706 and applications 708, but only one of each is shown in FIG. 7 to avoid overcomplicating the drawing. In some embodiments, database 706 and applications 708 may be integrated as one source device (e.g., that me be, but need not be, network entity 704). Although communications between database 706 and applications 708 with user devices 720 and 730 are shown as through communications network 702, in some embodiments, database 706 and applications 708 may communicate directly with user devices 720 and 730 via communications paths (not shown) such as those described above.

Database 706 may include one or more types of stored information, including, for example, relationship information, a relationship entity database, recipient information, historical communications records, user preferences, user profile information, a template database, any other suitable information, or any combination thereof. Applications 708 may include an applications-hosting database or server, plug-ins, a software developers kit (SDK), an applications programming interface (API), or other software tools configured to provide software (e.g., as download to a user device), run software remotely (e.g., hosting applications accessed by user devices), or otherwise provide applications support to applications of user devices 720 and 730. In some embodiments, information from network entity 704, database 706, applications 708, or a combination thereof may be provided to a user device using a client-server approach. For example, user device 720 or user device 730 may pull information from a server, or a server may push information to user device 720 or user device 730. In some embodiments, an application client residing on user device 720 or user device 730 may initiate sessions with database 706, applications 708, network entity 704, or a combination thereof to obtain information when needed (e.g., when data is out-of-date or when a user device receives a request from the user to receive data). In some embodiments, information may include user information. For example, the user information may include current and/or historical user activity information (e.g., what communications the user engages in, what times of day the user sends/receives messages, whether the user interacts with a social network, at what times the user interacts with a social network to post information, what types of content the user typically inserts in messages, stored contacts of the user, frequent contacts of the user, any other suitable information, or any combination thereof. In some embodiments, the user information may identify patterns of a given user for a period of more than one year.

In some embodiments, an application may include a message reconstructor as a stand-alone application implemented on user devices 720 and 730. For example, the application may be implemented as software or a set of executable instructions which may be stored in storage (e.g., storage 608) of the user devices (e.g., user device 600), and executed by control circuitry (e.g., control circuitry 604) of the user devices (e.g., user device 600). In some embodiments, an application may include a message reconstructor application that is implemented as a client-server-based application where only a client application resides on the user device, and a server application resides on a remote server (e.g., network entity 704). For example, message reconstructor applications may be implemented partially as a client application on user device 720 or user device 730 (e.g., by control circuitry 604 of user equipment device 600) and partially on a remote server as a server application running on control circuitry of the remote server (e.g., control circuitry of network entity 704). When executed by control circuitry of the remote server, the message reconstructor application may instruct the control circuitry to generate the displays and transmit the generated displays to user devices 720 and 730. The server application may instruct the control circuitry of the remote device to transmit data for storage on user device 720 or user device 730. The client application may instruct control circuitry of the receiving user device to generate the application displays.

In some embodiments, the arrangement of system 700 is a cloud-based arrangement. The cloud provides access to services, such as information storage, messaging, or social networking services, among other examples, as well as access to any content described above, for user devices. Services can be provided in the cloud through cloud computing service providers, or through other providers of online services. For example, the cloud-based services can include a storage service, a sharing site, a social networking site, or other services via which user-sourced content is distributed for viewing by others on connected devices. These cloud-based services may allow a user device to store information to the cloud and to receive information from the cloud rather than storing information locally and accessing locally stored information. Cloud resources may be accessed by a user device using, for example, a web browser, a messaging application, a desktop application, a mobile application, and/or any combination of access applications of the same. The user device may be a cloud client that relies on cloud computing for application delivery, or the user equipment device may have some functionality without access to cloud resources. For example, some applications running on the user device may be cloud applications (e.g., applications delivered as a service over the Internet), while other applications may be stored and run on the user device. In some embodiments, a user device may receive information from multiple cloud resources simultaneously.

Figure 8:
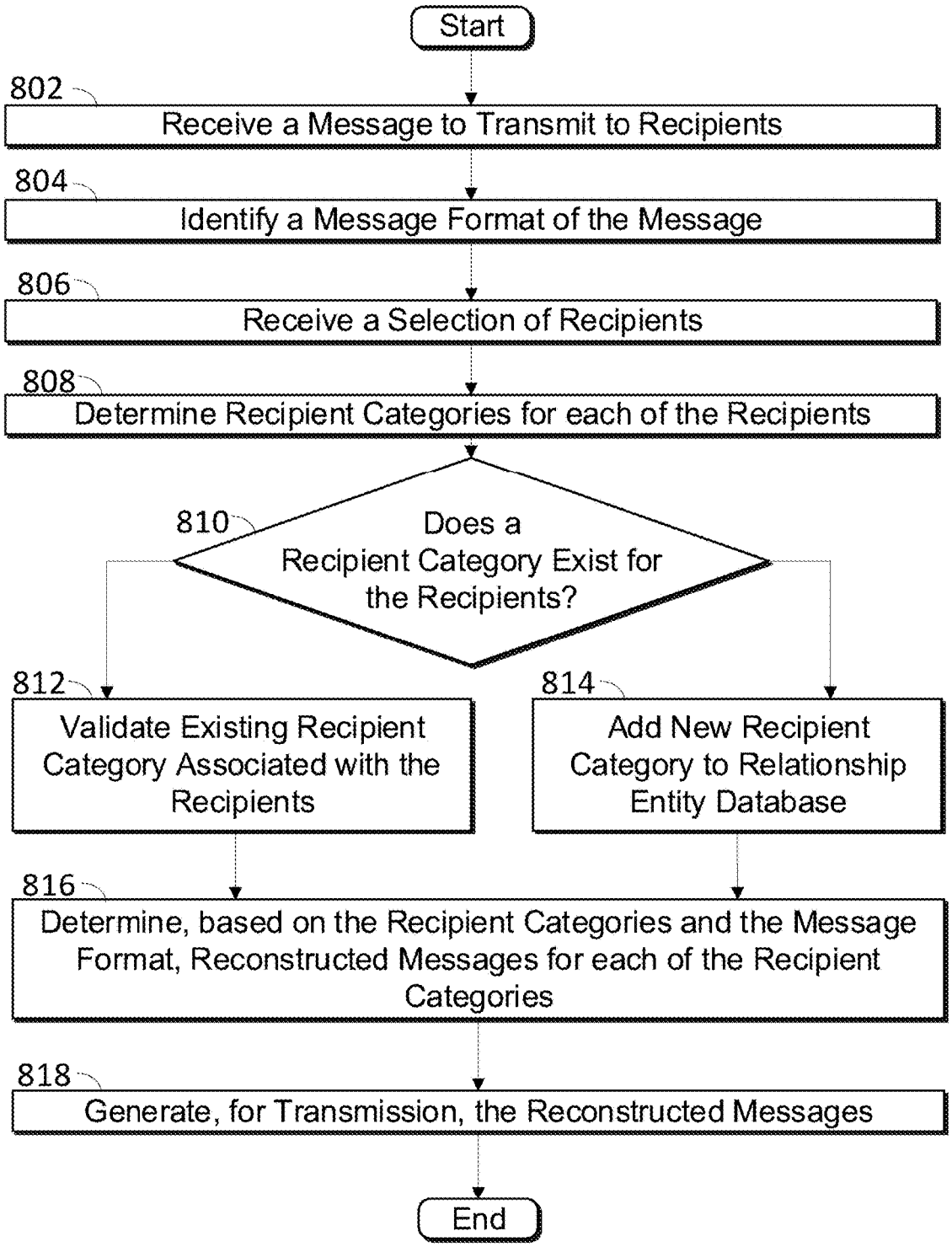
FIG. 8 shows a flowchart of an illustrative process for generating personalized messages, in accordance with some embodiments of the present disclosure.

FIG. 8 shows a flowchart of illustrative process 800 for generating personalized messages, in accordance with some embodiments of the present disclosure. In some embodiments, user device 600 may be used to perform the illustrative steps of process 800.

Step 802 includes control circuitry (e.g., control circuitry 604) receiving a message to transmit to a plurality of recipients. In some embodiments, a user may input a message (e.g., to user input interface 610, display 612 on a touchscreen, or both) of a user device. For example, a user may type a message on an electromechanical keyboard (e.g., a USB keyboard), or a touchscreen keyboard, or may speak a message to a microphone (e.g., of audio equipment 614) of a user device, and control circuitry (e.g., control circuitry 604) may identify words, commands, or phrases, and convert them to text. In an illustrative example, as shown in FIG. 5, a user may enter a message into a user device using a messaging application. In some embodiments, the control circuitry may generate a message that will be modified to broadcast to a plurality of recipients.

Step 804 includes control circuitry (e.g., control circuitry 604) identifying a message format of the received message of step 802. In some embodiments, the message format may include a text message (e.g., a SMS message), an email message (e.g., plaintext, or with embedded objects), a message in a messaging application, a social media message or post, any other suitable message, or any combination thereof.

Step 806 includes control circuitry (e.g., control circuitry 604) receiving the plurality of recipients. In some embodiments, a user may specify each recipient from a list of recipients. For example, a user may select recipients from among a contact list displayed on a user device. In some embodiments, a user may select a predetermined group of recipients (e.g., a broad grouping, a narrow grouping, or any other grouping), having any suitable number of relationship types. The plurality of recipients may be specified as a list, for example. In some embodiments, the sending entity (e.g., a user or a device) may determine a list of recipients to receive a message.

Step 808 includes control circuitry (e.g., control circuitry 604) determining recipient categories for each of the recipients. In some embodiments, each recipient is compared against a database of users (e.g., a relationship entity database) to determine a recipient category (e.g., a relationship). A recipient category may include a relationship identifier (e.g., coworker, boss, friend, family member, significant other, acquaintance, first friend group, second friend group), a grouping based on message preferences, any other suitable categorization, or any combination thereof. In some embodiments, the control circuitry (e.g., control circuitry 604) retrieves information from a server, database or other network device. For example, in some embodiments, the control circuitry provides a name to a database as input, and searches for s matching entry and then extracts the relationship type from the entry. In some embodiments, recipient categories may be stored on the user device. For example, in some embodiments, a contact list may include, for each contact, one or more categories to which that contact belongs.

Step 810 includes control circuitry (e.g., control circuitry 604) determining whether a recipient category exists for the recipients. In some embodiments, for each recipient, the control circuitry (e.g., control circuitry 604) determines which recipient categories correspond to the recipient. A recipient may have one or more corresponding recipient categories (e.g., relationships), or may not have a corresponding recipient category. In some embodiments, the control circuitry need not determine a recipient category. For example, the control circuitry may determine to send the message as received to the recipient if no category is determined (e.g., the message is not personalized or otherwise customized).

Step 812 includes control circuitry (e.g., control circuitry 604) validating existing recipient categories associated with recipients. In some embodiments, the control circuitry may determine that a recipient category is in agreement with an indicated category from a database or other suitable reference. In some embodiments, more than one recipient category may correspond to a recipient. In some such embodiments, the control circuitry may determine which recipient category to select for generating a message.

Step 814 includes control circuitry (e.g., control circuitry 604) adding a new recipient category to a relationship entity database. In some embodiments, if no recipient category currently corresponds to a recipient, the control circuitry may determine a recipient category. For example, a message reconstructor may include a relationship analyzer that accesses historical communications records to determine a relationship. In some embodiments, a user may be prompted to enter a recipient category for a recipient not already assigned a category. In some embodiments, the control circuitry may perform any of the illustrative techniques described in the context of FIG. 3 to determine and add a new recipient category.

Step 816 includes control circuitry (e.g., control circuitry 604) determining reconstructed messages (e.g., personalized messages) for each of the recipient categories based on the recipient categories and the message format. For each recipient category, the control circuitry may determine a message format to apply, a message template to apply, a set of text, images, or video to apply, any other suitable edits to the message, or any combination thereof. In some embodiments, the control circuitry determines a reconstructed message for each recipient category. In some embodiments, the control circuitry determines a reconstructed message for each recipient. In some embodiments, a message reconstructor determines an appropriate plug-in, application, module, or combination thereof to use for generating a personalized message. For each recipient or recipient category, the message reconstructor identifies aspects of the message that can be personalized. For example, the message reconstructor may access a predetermined database for this purpose. The message reconstructor may, for example, access a relationship entity database to determine personalization options for the recipient. The message reconstructor then generates the personalized message for transmittal. In some embodiments, the message reconstructor may generate personalized messages in parallel, in series, or a combination thereof. For example, a text plug-in may be configured to insert salutations, insert emojis, change fonts, change language, change wording, or a combination thereof. In a further example, an image plug-in may be configured to change texts in images, change background colors, change attached images, or a combination thereof. In a further example, a video plug-in may be configured to insert customized texts (e.g., an overlay) to a video message, insert a video clip in a text message, or a combination thereof. Reconstructed messages may be stored in storage (e.g., storage 608) of a user device, any other suitable storage, or any combination thereof.

Step 818 includes control circuitry (e.g., control circuitry 604) generating for transmission the reconstructed messages. In some embodiments, the control circuitry generates the reconstructed messages for transmission in series, one after another. In some embodiments, at least one of the reconstructed messages may be of a different type. For example, some the reconstructed messages may be SMS messages while other messages may be email messages. The control circuitry may generate for transmission all messages of a particular type first, and then proceed to generate messages of a different type for transmission. In some embodiments, reconstructed messages are generated for broadcast transmission, posting (e.g., on a social media page or feed), instant messaging, transmission to a message server, or a combination thereof.

In an illustrative example of process 800, a message reconstructor receives a message from a user to transmit to a plurality of recipients. For each respective recipient of the plurality of recipients, the message reconstructor identifies a respective relationship identifier between the user and the respective recipient, determines one or more modifiers to apply to the message based on the respective relationship identifier, determines a respective reconstructed message corresponding to the relationship identifier based on the one or more modifiers and the message, and generates the respective reconstructed message for transmission over a network. In some embodiments, identifying each respective relationship identifier includes accessing historical communications records stored in a database. In some embodiments, for example, the historical communications records include one of a stored chat group record, a stored contacts list, a stored text message record, a stored email message record, a stored social media post record, and a stored comments record corresponding to a media content item. In some embodiments, the message reconstructor extracts one or more patterns of conversation from the historical communications records, determines a relationship identifier based on the one or more patterns of conversation, and stores the relationship identifier in a database. In some embodiments, determining the one or more modifiers includes determining a modification to one of a salutation, a closing, and a displayed object. In some embodiments, determining the one or more modifiers includes determining one or more message templates to apply to the message. For example, determining the one or more message templates may include identifying an object in the message, determining a contextual indicator based at least in part on the object, and modifying one or more of a word, an emoticon, and a visual attribute of the message based on the contextual indicator. In an illustrative example, the one or more modifiers may include one of a text modifier, an image modifier, and a video modifier. In some embodiments, identifying the respective relationship identifier is based at least in part on the plurality of recipients. In some embodiments, for example, the relationship identifier includes a first identifier corresponding to a broad grouping of users, and the relationship identifier also includes a second identifier corresponding to a narrow grouping of users.

Figure 9:
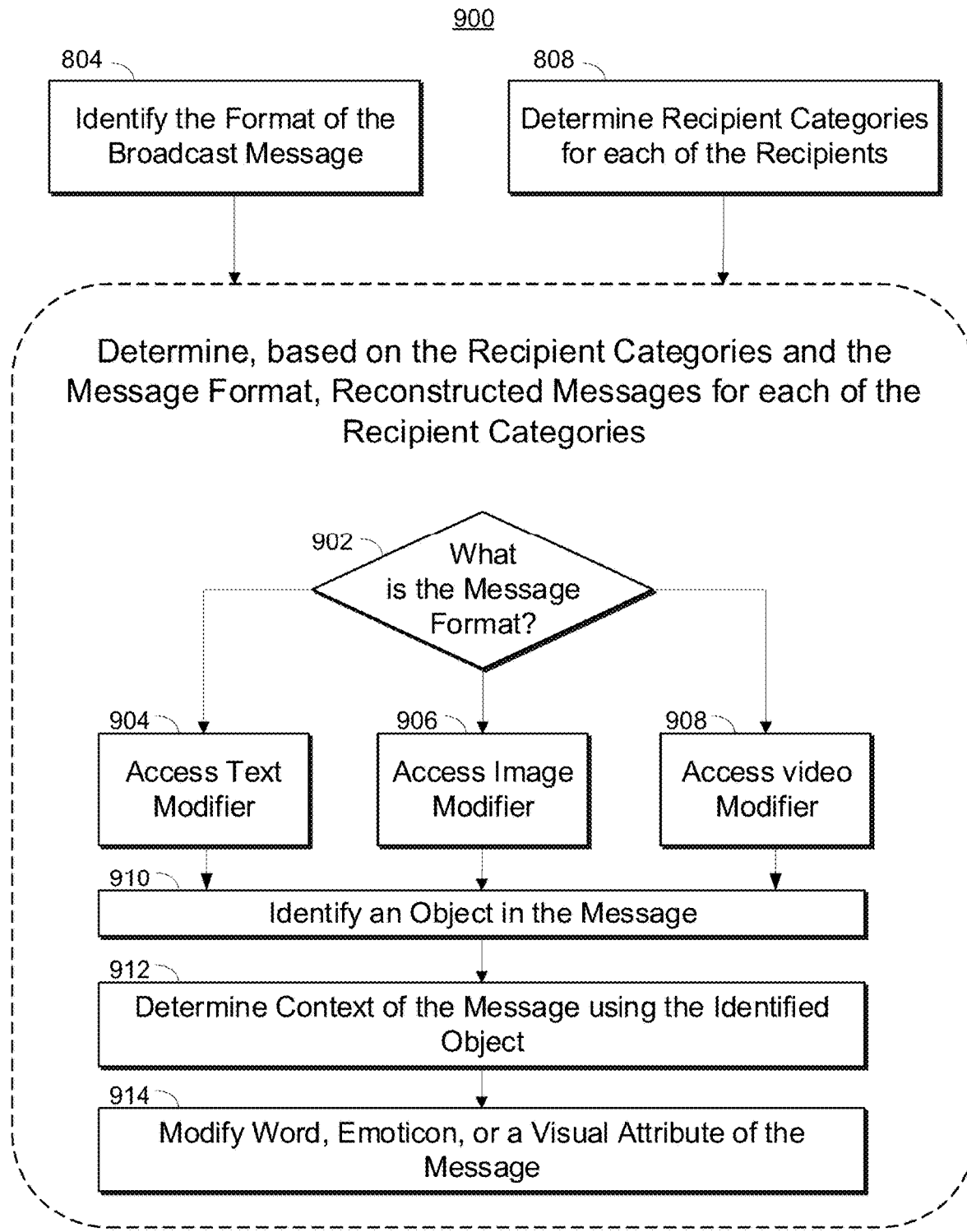
FIG. 9 shows a flowchart of an illustrative process for reconstructing messages based on recipient, in accordance with some embodiments of the present disclosure.

FIG. 9 shows a flow chart of illustrative process 900 for reconstructing messages based on recipient, in accordance with some embodiments of the present disclosure. As illustrated, steps 804 and 808 are included in process 900. Steps 804 and 808 are described more fully in the context of FIG. 8.

Step 902 includes control circuitry (e.g., control circuitry 604) determining the message format of a received message. The control circuitry may determine the message format based on the message itself, a template, a recipient category (e.g., a relationship), any other suitable information, or any combination thereof. For example, a message constructor may determine a message format is {salutation; original message; emoji; text}. In a further example, the message reconstructor may select a template from among a plurality of templates for formatting the message. In some embodiments, determining a format of the message includes determining a type of message. For example, a type may include a greeting, a holiday wish, an invitation, a congratulatory statement, an apology, an announcement, a question, a caption (e.g., to accompany an image or video), a social media post, any other suitable type of message, or any combination thereof. In some embodiments, the message reconstructor determines the message format based on the content of the received message. For example, the message reconstructor may identify a holiday name, a keyword, or other identifier and then determine a format based on the identifying.

Steps 904, 906, and 908 include the message reconstructor accessing a plug-in, application, functionality, or combination thereof based on the message format. For example, if the message format is text, the message reconstructor may access a text modifier to identify, and optionally modify, text of the message. In some embodiments, the message reconstructor performs all of steps 904, 906, and 908 to identify different types of objects in a message. The message reconstructor may perform any or all of steps 904, 906, and 908. In some embodiments, the message reconstructor need not perform step 902, and may proceed to access one or more modifiers to identify object(s) in the received message without first determining a format.

Step 904 includes control circuitry (e.g., control circuitry 604) accessing a text modifier. If the message reconstructor determines that the message format includes text, then the message reconstructor may access a text modifier to identify, add, remove, or otherwise modify text of the message to generate a reconstructed message. In some embodiments, the text modifier includes a replacement word (e.g., with a synonym), an abbreviation of a word, an altered spelling of a word, or other modification to one or more words or phrases of the message. For example, the received message may be "Happy New Year!" and the text modifier may replace the text with "Happy NYE" based on previous messages sent by the user for recipient category "Friend."

Step 906 includes control circuitry (e.g., control circuitry 604) accessing an image modifier. If the message reconstructor determines that the message format includes one or more images, then the message reconstructor may access the image modifier to identify, add, remove, or otherwise modify an image of the message to generate a reconstructed message. In some embodiments, messages intended for recipients of a particular category are reconstructed with an image. For example, the image may include a comical image with an overlaid caption shared among friends. In a further example, the image may include an image of the sending entity (e.g., from an image gallery stored on a sending user's user device). In a further example, the image may include a work-related logo, a sports-related logo, a shared picture, any other suitable image, or any combination thereof. In some embodiments, the image may be selected based on the message. For example, if a keyword is identified in the message that corresponds to a holiday, an image corresponding to the holiday may be inserted in the message. In some embodiments, the user may have predetermined images to include in messages to particular recipients. For example, each contact of a stored contact list may have one or more corresponding images stored, which are included in messages to that contact.

Step 908 includes control circuitry (e.g., control circuitry 604) accessing a video modifier. If the message reconstructor determines that the message format includes one or more videos, then the message reconstructor may access the video modifier to identify, add, remove, or otherwise modify a video of the message to generate a reconstructed message. In some embodiments, messages intended for recipients of a particular category are reconstructed with a video. For example, the video may include a comical video clip with an overlaid caption shared among friends. In a further example, the video may include a video clip of the sending user (e.g., from a video gallery stored on the sending user's user device). In some embodiments, the video may be selected based on the message. For example, if a keyword is identified in the message that corresponds to a holiday, a video corresponding to the holiday may be inserted in the message. In some embodiments, the user may have predetermined videos to include in messages to particular recipients. For example, each contact of a stored contact list may have one or more corresponding videos stored, which are included in messages to that contact.

Step 910 includes control circuitry (e.g., control circuitry 604) identifying an object in the message. In some embodiments, the message reconstructor identifies an object such as a word, a phrase, an emoticon (e.g., generated from text or punctuation characters), an emoji (e.g., a character image), an image, an icon, a video, any other suitable object, or any combination thereof. In some embodiments, the message reconstructor identifies an object in the received message using the text modifier, image modifier, or video modifier of steps 904, 906, and 908, respectively. For example, a received message may include an emoji, and the message reconstructor may determine that an intended recipient category for one recipient is "Supervisor." The message reconstructor may access the text modifier to remove the emoji, thus tailoring the message for a work supervisor. In some embodiments, the message reconstructor adds, removes, replaces, or otherwise modifies the object based on a recipient category, the type of the object, the message content, a selected message format, a selected message template, any other suitable criterion, or any combination thereof. In some embodiments, the message reconstructor parses the received message to determine all objects in the message, and then evaluates each object. In some embodiments, step 910 may be performed at the same time as step 902. For example, a message format may be determined based on one or more identified objects. To illustrate, text of the message may be identified as a seasonal greeting, and the message format may be determined to be text-based.

Step 912 includes control circuitry (e.g., control circuitry 604) determining context of the message using the identified object. In some embodiments, the message reconstructor may determine how to format customized messages based on identified objects. In some embodiments, the context may include recipient-specific information, time-and-date specific information, platform-specific information, message-specific information, any other indicator of context, or any combination thereof. For example, context may include an event, comment, image, or video relevant to a recipient. For example, if a message includes a seasonal greeting, and the date is near a recipient's birthday, the message reconstructor may determine that birthday-related text should be included in the message (e.g., a "and Happy Birthday!" sign-off at the end of the message). Context may include information from a recipient's social media, the recipient's communications history, information stored about the recipient on the sending user's device, metadata associated with the recipient, any other suitable information, or any combination thereof.

Step 914 includes control circuitry (e.g., control circuitry 604) modifying a word, text, image, emoji, emoticon, video, or any other visual attribute of the message. In some embodiments, based on the message format, identified objects, and context, the message reconstructor modifies one or more aspects of the message to generate a reconstructed message. In some embodiments, a text modifier, an image modifier, a video modifier, or a combination thereof includes a dictionary of text, images, and videos, or modifications thereof, that may be included in a message intended to be sent to a recipient of the recipient list. Modification may include, for example, addition, removal, replacement, or other modification of an object or visual attribute.

In some embodiments, for example, the message reconstructor receives a message, identifies the message format and context for each recipient, and identifies one or more objects in the message. In some embodiments, the message reconstructor determines whether any objects of a message need to be modified, and if not, the received message is transmitted to one or more recipients without modification. In some embodiments, the message format is used to determine what objects may be included in a reconstructed message.

The above-described embodiments of the present disclosure are presented for purposes of illustration and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A method for personalizing messages based on recipient relationships, the method comprising:
    storing, in a database for a sender account, relationship information for each of a plurality of potential recipients, wherein the database stores for each respective potential recipient at least one contact category of a plurality of contact categories that the respective potential recipient belongs to, and wherein the storing the relationship information comprises storing the at least one contact category of the respective potential recipient that is obtained from information communicated via a social network associated with at least one of the respective potential recipient or the sender account;
    receiving at least one request from a device associated with the sender account to send a first message to a first recipient of the plurality of potential recipients and a second message to a second recipient of the plurality of potential recipients;
    processing a first request of the at least one request to send the first message to the first recipient by:
        retrieving, by a message constructor, relationship information for the first recipient from the database which identifies that the first recipient belongs to a first contact category of the plurality of contact categories;
        accessing, by the message constructor, a first message template based on the first contact category;
        generating, by the message constructor, the first message by applying a first modification based on the first message template; and
        transmitting over a network the first message to the first recipient; and
    processing a second request of the at least one request to send the second message to the second recipient by:
        retrieving, by the message constructor, relationship information for the second recipient from the database which identifies that the second recipient belongs to a second contact category of the plurality of contact categories;
        accessing, by the message constructor, a second message template based on the second contact category;
        generating, by the message constructor, the second message by applying a second modification based on the second message template; and
        transmitting over the network the second message to the second recipient.

2. The method of claim 1, wherein:
    the applying the first modification based on the first message template comprises inserting at least a first word in the first message template; and
    the applying the second modification based on the second message template comprises inserting at least a second word in the second message template, wherein the second word is different from the first word.

3. The method of claim 1, wherein the message constructor is a sub-application of an application executed by a server, wherein the application executed by the server is configured to perform the storing, in the database for the sender account, the relationship information for each of the plurality of potential recipients, the receiving the at least one request, the transmitting over the network the first message, and the transmitting over the network the second message.

4. The method of claim 3, wherein the at least one request received from the device associated with the sender account causes the message constructor executed by the server to generate the first message and to generate the second message.

5. The method of claim 1, wherein:
the transmitting over the network the first message to the first recipient comprises transmitting the first message from a server application to a first client device associated with the first recipient; and
the transmitting over the network the second message to the second recipient comprises transmitting the second message from the server application to a second client device associated with the second recipient.

6. The method of claim 1, wherein at least one of the first contact category or the second contact category indicates that at least one of the first recipient or the second recipient is an individual with a school relationship.

7. The method of claim 1, wherein at least one of the first contact category or the second contact category indicates that at least one of the first recipient or the second recipient is a coworker.

8. The method of claim 1, wherein the first contact category indicates that the first recipient is an individual with a school relationship and the second contact category indicates that the second recipient is a coworker.

9. The method of claim 1, wherein:
the applying the first modification based on the first message template comprises applying a first formatting change to the first message; and
the applying the second modification based on the second message template comprises applying a second formatting change to the second message.

10. The method of claim 1, further comprising:
determining, based on the at least one request, first contextual information corresponding to the first message and second contextual information corresponding to the second message; and
wherein the first message template is accessed based at least partially on the first contextual information and the second message template is accessed based at least partially on the second contextual information.

11. A system for personalizing messages based on recipient relationships, the system comprising:
a memory configured to store a database configured to store, in a sender account, relationship information for each of a plurality of potential recipients, wherein the database stores for each respective potential recipient at least one contact category of a plurality of contact categories that the respective potential recipient belongs to, and wherein the database stores the at least one contact category of the respective potential recipient that is obtained from information communicated via a social network associated with at least one of the respective potential recipient or the sender account; and
input/output circuitry configured to receive at least one request from a device associated with the sender account to send a first message to a first recipient of the plurality of potential recipients and a second message to a second recipient of the plurality of potential recipients;
control circuitry configured to process a first request of the at least one request to send the first message to the first recipient by:
retrieving, using a message constructor, relationship information for the first recipient from the database which identifies that the first recipient belongs to a first contact category of the plurality of contact categories;
accessing, using the message constructor, a first message template based on the first contact category; and
generating, using the message constructor, the first message by applying a first modification based on the first message template;
wherein the input/output circuitry is further configured to transmit over a network the first message to the first recipient;
wherein the control circuitry is further configured to process another a second request of the at least one request to send the second message to the second recipient by:
retrieving, using the message constructor, relationship information for the second recipient from the database which identifies that the second recipient belongs to a second contact category of the plurality of contact categories;
accessing, using the message constructor, a second message template based on the second contact category; and
generating, using the message constructor, the second message by applying a second modification based on the second message template; and
wherein the input/output circuitry is further configured to transmit over the network the second message to the second recipient.

12. The system of claim 11, wherein the control circuitry is further configured to:
apply the first modification based on the first message template by inserting at least a first word in the first message template; and
apply the second modification based on the second message template by inserting at least a second word in the second message template, wherein the second word is different from the first word.

13. The system of claim 11, wherein the control circuitry is configured to execute an application, and wherein the message constructor is a sub-application of the application.

14. The system of claim 13, wherein the at least one request received from the device associated with the sender account causes the control circuitry to generate the first message and to generate the second message.

15. The system of claim 11, wherein the input/output circuitry is further configured to:
when transmitting over the network the first message to the first recipient, transmit the first message from a server application to a first client device associated with the first recipient; and
when transmitting over the network the second message to the second recipient, transmit the second message from the server application to a second client device associated with the second recipient.

16. The system of claim 11, wherein at least one of the first contact category or the second contact category indicates that at least one of the first recipient or the second recipient is an individual with a school relationship.

17. The system of claim 11, wherein at least one of the first contact category or the second contact category indicates that at least one of the first recipient or the second recipient is a coworker.

18. The system of claim 11, wherein the first contact category indicates that the first recipient is an individual with a school relationship and the second contact category indicates that the second recipient is a coworker.

19. The system of claim 11, wherein the control circuitry is further configured to:

apply the first modification based on the first message template by applying a first formatting change to the first message; and apply the second modification based on the second message template by applying a second formatting change to the second message.

20. The system of claim 11, wherein the control circuitry is further configured to:

determine, based on the at least one request, first contextual information corresponding to the first message and second contextual information corresponding to the second message;

wherein the control circuitry is configured to access the first message template based at least partially on the first contextual information; and wherein the control circuitry is configured to access the second message template based at least partially on the second contextual information.

\* \* \* \* \*